US008064339B2

(12) United States Patent
Sullivan et al.

(10) Patent No.: US 8,064,339 B2
(45) Date of Patent: *Nov. 22, 2011

(54) SYSTEM AND METHOD FOR TROUBLESHOOTING BROADBAND CONNECTIONS

(75) Inventors: Marc Andrew Sullivan, Austin, TX (US); Adam Lee Klein, Cedar Park, TX (US); Wesley McAfee, Cedar Park, TX (US); Charles Scott, Austin, TX (US); Donn E. Willburn, Jr., Seagoville, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/395,166

(22) Filed: Feb. 27, 2009

(65) Prior Publication Data
US 2009/0161532 A1 Jun. 25, 2009

Related U.S. Application Data

(63) Continuation of application No. 10/975,034, filed on Oct. 27, 2004, now Pat. No. 7,518,991.

(51) Int. Cl.
*H04L 12/26* (2006.01)

(52) U.S. Cl. .................................. 370/225; 370/242

(58) Field of Classification Search .................. 370/225, 370/226, 227, 228, 241, 242, 401
See application file for complete search history.

(56) References Cited

U.S. PATENT DOCUMENTS
5,627,836 A 5/1997 Conoscenti
(Continued)

FOREIGN PATENT DOCUMENTS
WO 0237739 A2 5/2002

OTHER PUBLICATIONS

International Search Report for International Patent No. PCT/US05/37013, mailed on Sep. 26, 2006.
(Continued)

*Primary Examiner* — Min Jung
(74) *Attorney, Agent, or Firm* — Toler Law Group

(57) ABSTRACT

A method is disclosed that includes detecting a problem with a broadband connection at an end device and determining whether the problem can be resolved at the end device. The method also includes requesting that a data network connection device remotely connected to the end device attempt to determine a cause of the problem when the end device cannot resolve the problem. The method also includes determining whether the broadband connection is available. When the broadband connection is available, the method includes initiating a broadband data communication session via the data network connection device.

20 Claims, 4 Drawing Sheets

U.S. PATENT DOCUMENTS

| | | | |
|---|---|---|---|
| 5,712,903 A | 1/1998 | Bartholomew | |
| 5,926,476 A | 7/1999 | Ghaibeh | |
| 6,147,965 A | 11/2000 | Burns et al. | |
| 6,411,623 B1 | 6/2002 | DeGollado et al. | |
| 6,490,620 B1 | 12/2002 | Ditmer et al. | |
| 6,574,308 B1 | 6/2003 | Macdonald et al. | |
| 6,658,052 B2 | 12/2003 | Krinsky et al. | |
| 6,704,287 B1 * | 3/2004 | Moharram | 370/242 |
| 6,711,134 B1 * | 3/2004 | Wichelman et al. | 370/241 |
| 6,725,176 B1 | 4/2004 | Long et al. | |
| 6,728,239 B1 | 4/2004 | Kung | |
| 6,853,680 B1 | 2/2005 | Nikolich | |
| 7,092,364 B1 | 8/2006 | Franklin et al. | |
| 7,120,139 B1 | 10/2006 | Kung et al. | |
| 7,254,110 B2 * | 8/2007 | Wissing et al. | 370/218 |
| 7,289,489 B1 | 10/2007 | Kung et al. | |
| 7,349,345 B1 * | 3/2008 | Hansen et al. | 370/242 |
| 7,518,991 B2 * | 4/2009 | Sullivan et al. | 370/225 |
| 2001/0043562 A1 * | 11/2001 | Hrastar et al. | 370/227 |
| 2002/0101818 A1 * | 8/2002 | Teixeira | 370/217 |
| 2003/0009306 A1 * | 1/2003 | Fang | 702/122 |
| 2003/0021388 A1 | 1/2003 | Starr et al. | |
| 2003/0079028 A1 | 4/2003 | Kortum et al. | |
| 2003/0231206 A1 | 12/2003 | Armstrong | |
| 2005/0174935 A1 * | 8/2005 | Segel | 370/228 |

OTHER PUBLICATIONS

Written Opinion of International Searching Authority for PCT/US05/37013, mailed on Sep. 26, 2006.

European Search Report for Application No. PCT/US2005037013, Mailed on Oct. 20, 2009.

EPO Communication for Application No. 05 823 449.3 - 2414 dated Dec. 30, 2010, 4 pp.

* cited by examiner

SYSTEM AND METHOD FOR TROUBLESHOOTING BROADBAND CONNECTIONS

CLAIM OF PRIORITY

The present application claims priority from and is a continuation of patent application Ser. No. 10/975,034 filed on Oct. 27, 2004 and entitled "SYSTEM AND METHOD FOR TROUBLESHOOTING BROADBAND CONNECTIONS," the contents of which are expressly incorporated herein by reference in their entirety.

FIELD OF THE DISCLOSURE

The present disclosure relates generally to the troubleshooting of broadband connections.

BACKGROUND

Broadband Internet connections, e.g., digital subscriber line (DSL) connections, asymmetric digital subscriber line (ADSL) connections, cable connections, etc., are extremely popular. However, from a service provider perspective, the expenses associated with supporting broadband service can be relatively high. The expense is largely due to the lack of maturity of the technology and the manner in which computer operating systems handle broadband connectivity. Due to the high cost of support, a variety of software programs for supporting broadband connectivity have been developed. These software programs include programs that are installed on a user computer to aid in diagnosing and fixing problems without requiring a costly call to a customer service help desk at service provider. Further, when diagnosing and fixing problems with a broadband connection, these software programs typically rely on information that is obtained only by the computer and not on information that can be obtained by other equipment in the network.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION

In a particular embodiment, a method is disclosed that includes detecting a problem with a broadband connection at an end device and determining whether the problem can be resolved at the end device. The method also includes requesting that a data network connection device remotely connected to the end device attempt to determine a cause of the problem when the end device cannot resolve the problem. The method also includes determining whether the broadband connection is available. When the broadband connection is available, the method includes initiating a broadband data communication session via the data network connection device.

In another particular embodiment, a network system is disclosed that includes a data network connection device. The network system also includes a computer coupled to the data network connection device. The computer includes a first diagnostic module. The data network connection device is configured to establish a first data network connection to an Internet service provider. The data network connection device is further configured to establish a second data network connection between the data network connection device and the Internet service provider when a problem with the first data network connection is identified by the first diagnostic module.

Figure 1:
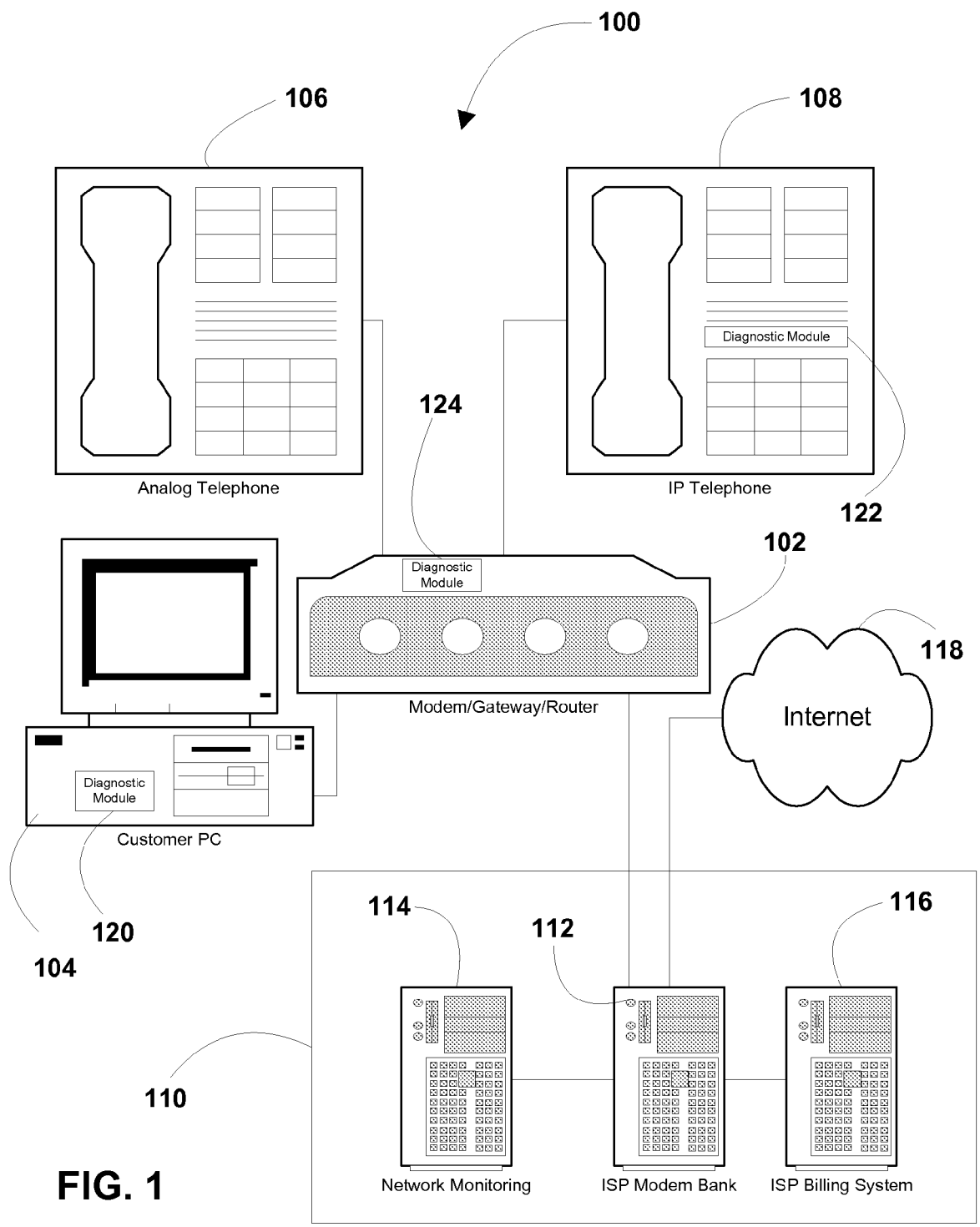
FIG. 1 is a diagram of a data network system.

Referring to FIG. 1, a data network system is shown and is generally designated 100. As illustrated, the data network system 100 includes a data network connection device 102, e.g., a modem, a gateway, a router, etc. Further, a computer 104 is connected to the data network connection device 102. In a particular embodiment, the computer 104 is a desktop computer, a laptop computer, a handheld computer, or a set top box that includes a microprocessor. FIG. 1 also shows an analog telephone 106 and an Internet protocol (IP) telephone 108 that are coupled to the data network connection device 102. In a particular embodiment, the computer 104 and the IP telephone 108 can be considered end devices and they can receive content via a broadband connection, e.g., a digital subscriber line (DSL) connection. In a particular embodiment, the computer 104 can also receive signals via an analog connection. Further, the analog telephone 106 can receive content via an analog connection.

As further shown in FIG. 1, the data network connection device 102 is connected to an Internet service provider (ISP) 110 via one or more broadband connections, one or more analog connections, one or more wireless connections, or a combination thereof, e.g., a broadband connection and an analog connection. Moreover, one or more of the connections can be established via a wired connection, a fiber optic connection, or a wireless connection, such as, an 802.11 connection. Specifically, the data network connection device 102 is connected to an ISP modem bank server 112 at the ISP 110. FIG. 1 also shows that a data network monitoring server 114 and an ISP billing system server 116 can be connected to the ISP modem bank server 112 within the ISP 110. Accordingly, each server 112, 114, 116 can be accessed by the computer 104, the analog telephone 106, and the IP telephone 108 via the data network connection device 102. As shown in FIG. 1, the ISP 100 can provide connectivity to a data network 118, e.g., the Internet. In a particular embodiment, the broadband connections are established via one or more a DSL connections.

FIG. 1 also indicates that the computer 104 can include a diagnostic module 120. Additionally, the IP telephone 108 can include a diagnostic module 122. Further, the data network connection device 102 can include a diagnostic module 124. In a particular embodiment, each diagnostic module 120, 122, 124 is a software tool that includes one or more logic steps that can be executed in order to diagnose one or more problems with a broadband connection, such as a broadband connection between the computer 104 and the ISP 110 established via the data network connection device 102.

Figure 2:
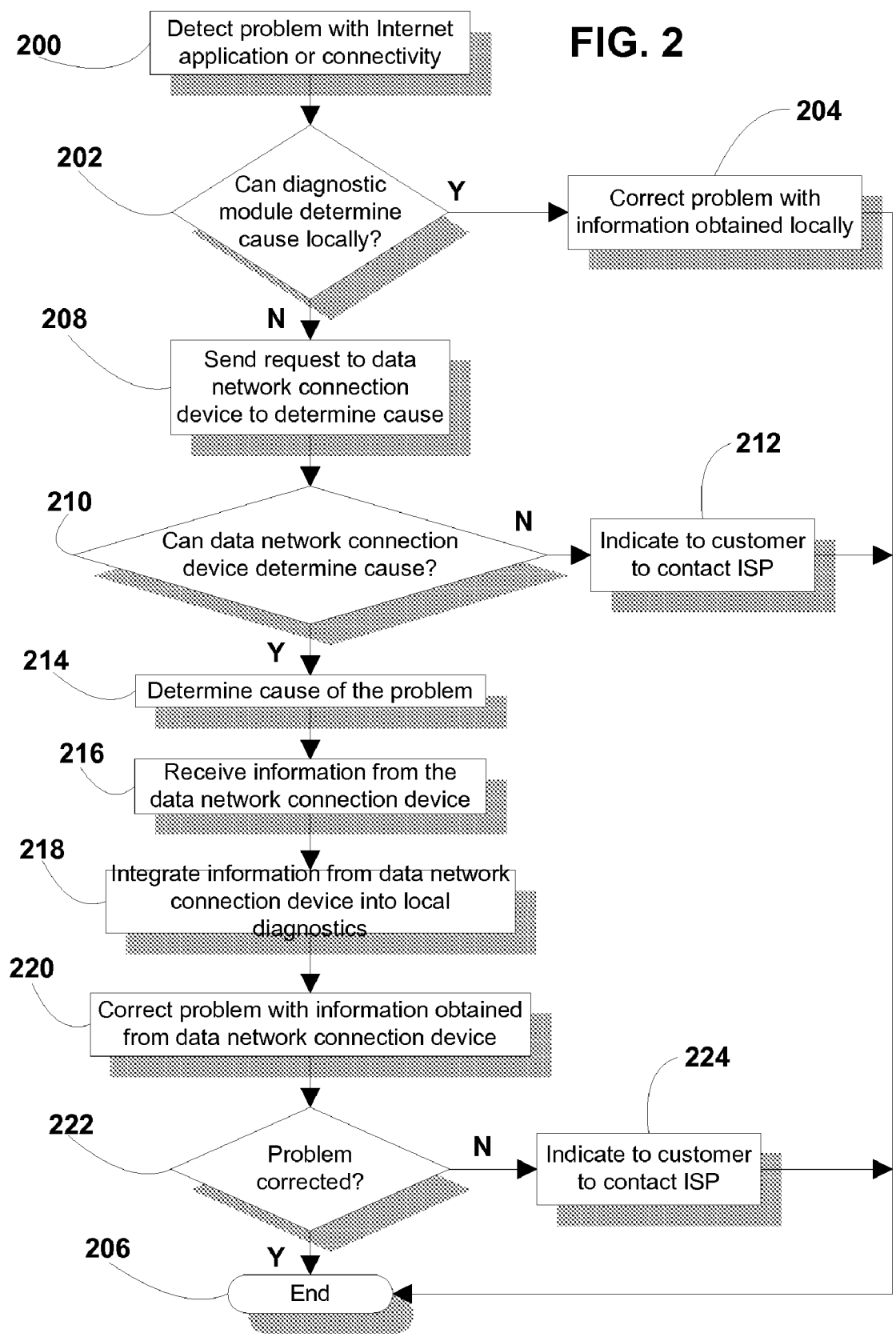
FIG. 2 is a flow chart to illustrate a method for troubleshooting a broadband connection.

Referring to FIG. 2, a method for troubleshooting a broadband connection is shown and commences at block 200 where a problem is detected with a broadband application at the computer 104 (FIG. 1) or with broadband connectivity to the computer 104 (FIG. 1). At decision step 202, a determination is made in order to ascertain whether the diagnostic module 120 (FIG. 1) at the computer 104 (FIG. 1) can determine the cause of the problem locally. If so, the logic proceeds to block 204 and the problem is corrected locally by the diagnostic module 120 (FIG. 1) within the computer 104 (FIG. 1). The logic then ends at state 206.

Returning to decision step 202, if the diagnostic module 120 (FIG. 1) cannot determine the cause of the problem locally, a request is sent to the data network connection device 102 (FIG. 1) to determine the cause of the problem. In a particular embodiment, the data network connection device 102 (FIG. 1) is point-to-point protocol over Ethernet (PPPoE) enabled and the request is an extensible markup language (XML) request. Next, at decision step 210 a decision is made in order to determine whether the data network connection device 102 (FIG. 1), e.g., diagnostic module 124 (FIG. 1) therein, can determine the cause of the problem. If the data network connection device 102 (FIG. 1) cannot determine the cause of the problem, an indication is sent to the computer 104 (FIG. 1) to indicate to the user to contact the ISP directly, e.g., via the analog telephone 106 (FIG. 1), in order to further troubleshoot the broadband connection issue. The logic then ends at state 206.

At decision step 210, if the data network connection device 102 (FIG. 1) can determine the cause of the problem, the logic proceeds to block 214 and determines the cause of the problem with the broadband connection to the computer 104 (FIG. 1). Continuing to block 216, information is sent from the data network connection device 102 (FIG. 1) and received by the computer 104 (FIG. 1). At block 218, the information from the data network connection device 102 (FIG. 1) is integrated with the diagnostic information determined locally by the diagnostic module 120 (FIG. 1). Thereafter, at block 220, an attempt is made to correct the problem with the broadband connection based on the information obtained by the data network connection device 102 (FIG. 1), and sent to the computer, and any information obtained locally. Moving to decision step 222, a determination is undertaken by the diagnostic module 120 (FIG. 1) at the computer 104 (FIG. 1) in order to ascertain whether the problem is corrected. If the problem is not corrected the logic continues to block 224 and an indication is sent to the computer 104 (FIG. 1) asking the user to contact the ISP directly in order to troubleshoot the broadband connection to the computer 104 (FIG. 1). The logic then ends at state 206.

Figure 3:
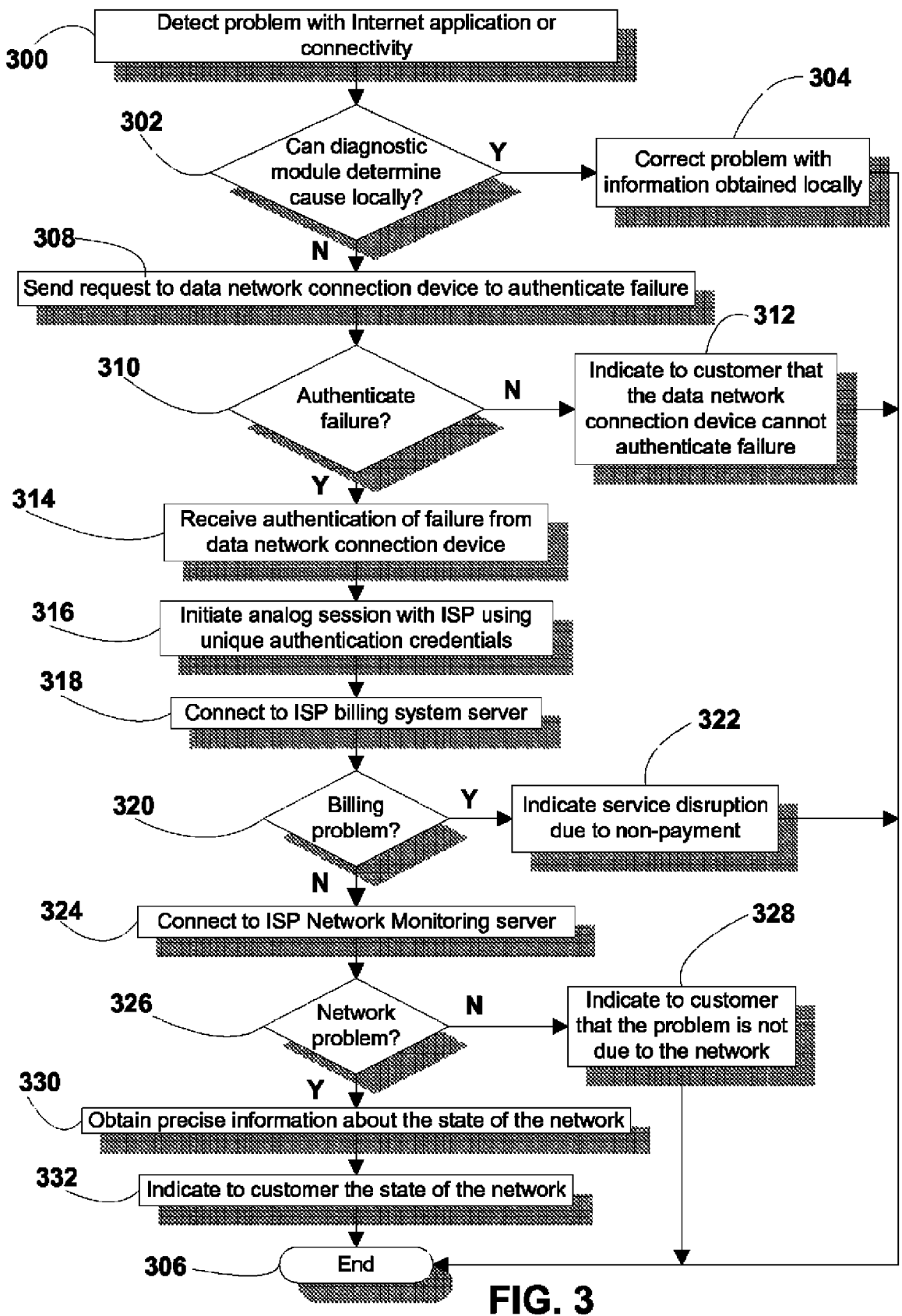
FIG. 3 is a flow chart to illustrate an alternative method for troubleshooting a broadband connection.

Referring now to FIG. 3, an alternative method for troubleshooting a broadband connection is shown and commences at block 300 where a problem is detected with a broadband application at the computer 104 (FIG. 1) or with broadband connectivity to the computer 104 (FIG. 1). At decision step 302, a determination is made in order to ascertain whether the diagnostic module 120 (FIG. 1) at the computer 104 (FIG. 1) can determine the cause of the problem locally. If so, the logic proceeds to block 304 and the problem is corrected locally by the diagnostic module 120 (FIG. 1). The logic then ends at state 306.

Returning to decision step 302, if the diagnostic module 120 (FIG. 1) cannot determine the cause of the problem locally, a request is sent to the data network connection device 102 (FIG. 1) to authenticate the failure of the broadband connection to the computer 104 (FIG. 1). In a particular embodiment, the request is sent in XML to the PPPoE enabled data network connection device 102 (FIG. 1). Next, at decision step 310 a decision is made in order to determine whether the data network connection device 102 (FIG. 1) can authenticate the failure. If the data network connection device 102 (FIG. 1) cannot authenticate the failure, the logic moves to block 312 and an indication is sent to the computer 104 (FIG. 1) that the failure cannot be authenticated by the data network connection device 102 (FIG. 1). The logic then ends at state 306.

At decision step 310 if the data network connection device 102 (FIG. 1) can authenticate the failure, the logic proceeds to block 314 and the computer 104 (FIG. 1) receives an authentication of failure of the broadband connection from the data network connection device 102 (FIG. 1). Continuing to block 316, an analog session is initiated with the ISP modem bank server 112 (FIG. 1). This can be done using unique authentication credentials to authenticate the analog session with the ISP modem bank server 112 (FIG. 1). In a particular embodiment, the set of authentication credentials can include a device identification number, a user identification number, a password, etc. Particularly, the credentials to authenticate the analog session may be different than credentials used to initiate and authenticate a broadband session between the computer 104 (FIG. 1) and the ISP provider 110 (FIG. 1). Moving to block 318, the data network connection device 102 (FIG. 1) connects to the ISP billing system server 116. Next, at decision step 320, a determination is made as to whether the cause of the problem is a billing problem, e.g., non-payment of a bill. Particularly, that determination can be made by querying the ISP billing system server 116 (FIG. 1) from the data network connection device 102 (FIG. 1). If the cause of the problem is a billing problem, the logic moves to block 322, and an indication is sent to the computer 104 (FIG. 1) that the disruption of the broadband service is due to non-payment. The logic then ends at state 306.

Returning to decision step 320, if the problem with the broadband connection is not a billing problem, the logic moves to block 324 and the data network connection device 102 (FIG. 1) connects to the ISP network monitoring server 114. Proceeding to decision step 326, a determination is made in order to determine whether the problem is a network problem. If the problem is not a network problem, the logic moves to block 328 and an indication is sent to the computer 102 (FIG. 1) that the problem is not due to the network. As such, the user may have to further troubleshoot the computer 104 (FIG. 1) to determine if the problem is due to, for example, a software error. The logic then ends at state 306. On the other hand, at decision step 326, if the problem is a network problem, the data network connection device 102 (FIG. 1) obtains precise information about the state of the network at block 330. Next, at block 332, an indication is sent to the computer 104 (FIG. 1) and the user concerning the state of the network. The logic then ends at state 306. The indication can include information concerning whether the entire network is down, whether the network is currently being repaired, or any other information concerning the network.

Figure 4:
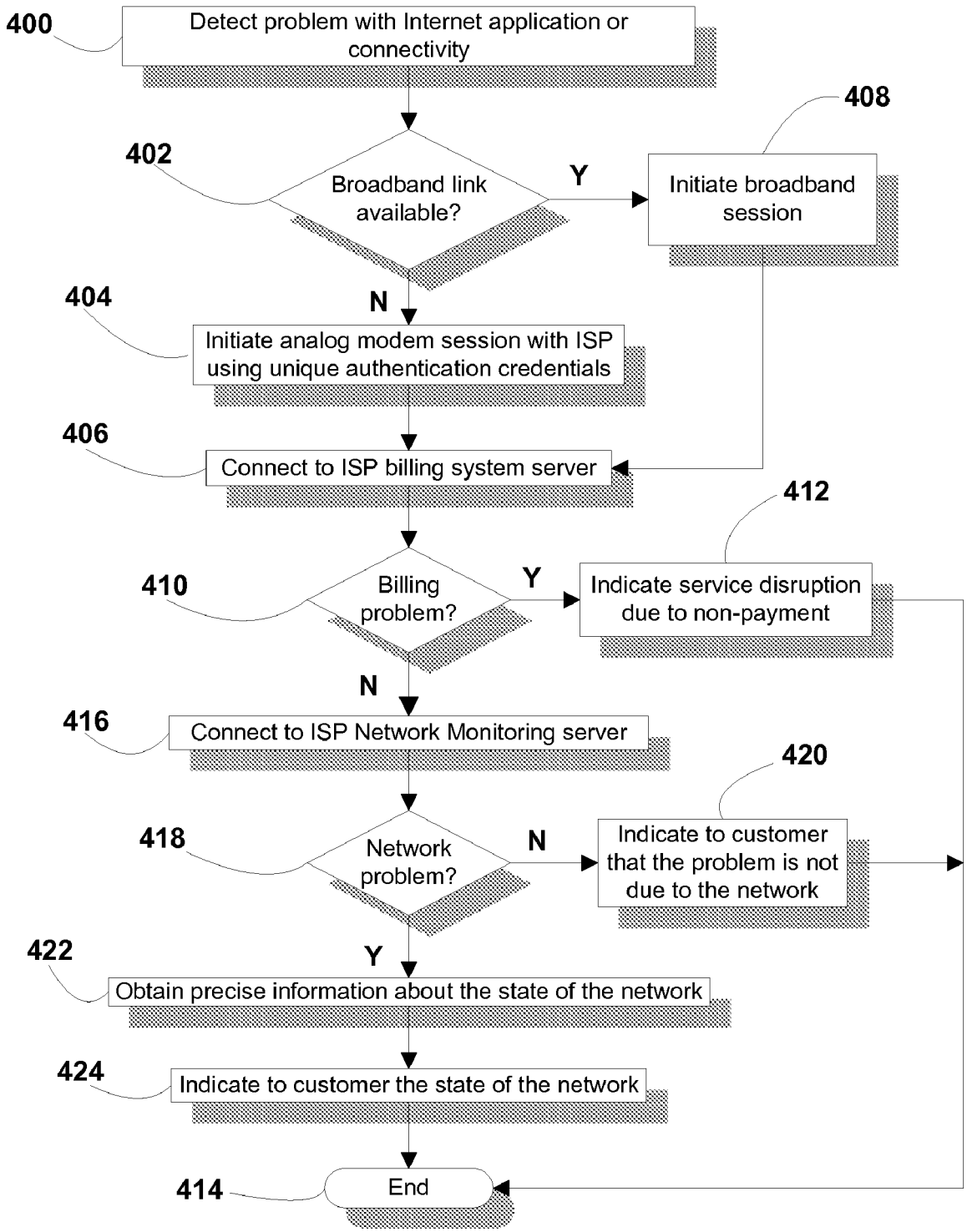
FIG. 4 is a flow chart to illustrate another alternative method for troubleshooting a broadband connection.

FIG. 4 shows another alternative method for troubleshooting a broadband connection. Commencing at block 400, a problem is detected with an Internet application or connectivity at the IP telephone 108 (FIG. 1), e.g., by the diagnostic module 122 (FIG. 1) within the IP telephone 108 (FIG. 1). At decision step 402, a determination is made in order to ascertain whether a broadband link is available at the data network connection device 102 (FIG. 1), e.g., by querying the data network connection device 102 (FIG. 1). If a broadband link is not available, the logic proceeds to block 404 and an analog session is initiated between the ISP modem bank server 112 (FIG. 1) and the data network connection device 102 (FIG. 1). In a particular embodiment, the analog session may be initiated using unique credentials in order to authenticate the analog session with the ISP modem bank server 112 (FIG. 1). Particularly, the credentials used to authenticate the analog session may be different than credentials that are used to authenticate a broadband session. Moving to block 406, the data network connection device 102 (FIG. 1) connects to the ISP billing system server 112. The logic then moves to decision step 410.

Returning to decision step 402, if a broadband link is available, the logic moves to block 408 and a broadband session is initiated at the data network connection device 102 (FIG. 1). The logic then proceeds to decision step 410. At decision step 410, a determination is made in order to ascertain whether the cause of the problem is a billing problem, e.g., non-payment of a bill. If the cause of the problem is a billing problem, the logic moves to block 412, and an indication is sent to the customer that the disruption of the broadband service is due to non-payment.

In a particular embodiment, the indication is sent to the customer via the broadband connection between the data network connection device 102 (FIG. 1) and the IP telephone 108 (FIG. 1). Specifically, a digital message consisting of pre-recorded voice data packets can be sent to the IP telephone 108 (FIG. 1), e.g., as a VoIP telephone call. The message can be listened to in real-time or it can be recorded at the IP telephone 108 (FIG. 1) and listened to later. The digital message can also include text data packets that are sent to the IP telephone 108 (FIG. 1) and displayed at a display screen on the IP telephone 108 (FIG. 1).

In another particular embodiment, the indication can be sent to the customer via the analog connection between the data network connection device 102 (FIG. 1) and the analog telephone 106 (FIG. 1). Particularly, a pre-recorded analog message can be sent to analog telephone 106 (FIG. 1) where it can be listened to by the customer, e.g., in real time or as a recorded voice mail message. After the indication is sent to the customer, either via the analog telephone 106 (FIG. 1) or the IP telephone 108 (FIG. 1), the logic ends at state 414.

Returning to decision step 410, if the problem with the broadband connection is not a billing problem, the logic moves to block 416 and the data network connection device 102 (FIG. 1) connects to the ISP network monitoring server 114 (FIG. 1). Proceeding to decision step 418, a determination is made in order to determine whether the problem is a network problem. If the problem is not a network problem, the logic moves to block 420 and an indication is sent to customer that the problem is not due to the network. As such, the user may have to further troubleshoot the IP telephone 108 to determine if the problem is due to an internal problem with the IP telephone 108. Depending on the session initiated above, e.g., analog or broadband, the indication is sent from the data network connection device 102 (FIG. 1) to the analog telephone 106 (FIG. 1) or from the data network connection device 102 (FIG. 1) to the IP telephone 108 (FIG. 1). The logic then ends at state 414.

On the other hand, at decision step 418, if the problem is a network problem, the data network connection device 102 (FIG. 1) can obtain precise information about the state of the network at block 422. Next, at block 424, an indication is sent to the customer concerning the state of the network. The indication can be sent to the analog telephone 106 (FIG. 1) or the IP telephone (FIG. 1) depending on the session initiated above. Further, the indication can include information on whether the network or a server within the network is currently down, under repair, being upgraded, etc. The logic then ends at state 414.

With the configuration of structure described above, the system and method for troubleshooting broadband connections provides capability for troubleshooting a problem with a broadband connection at a user computer using information obtained by the user computer and using information obtained by other components in the system, e.g., a data network connection device. Information relating to the problem can be sent to the user computer by the data network connection device. For example, if broadband service to a user computer is interrupted the user computer can request that the data network connection device determine the cause of the interruption. The data network connection device can then contact an Internet service provider via a backup or reserve connection, e.g., a second broadband connection that may be established using a second set of authentication credentials or an analog connection that may be established using a second set of authentication credentials. With the reserve connection, the data network connection device can determine if the interruption is due to a legitimate problem with the broadband network or simply a billing matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method, comprising:
   detecting at an end device a problem with a broadband connection;
   determining that the problem cannot be resolved at the end device;
   in response to determining that the problem cannot be resolved at the end device, requesting that a data network connection device remotely connected to the end device determine a cause of the problem;
   determining that the broadband connection is available;
   in response to determining that the broadband connection is available, initiating a broadband data communication session via the data network connection device, wherein the broadband data communication session includes an inquiry to a billing server to determine if the problem is a billing problem; and
   receiving an indication from the billing server whether the problem is a billing problem.

2. The computer-implemented method of claim 1, further comprising resolving the problem at the end device at least partially based on information obtained via the data network connection device.

3. The computer-implemented method of claim 2, further comprising resolving the problem at the end device at least partially based on information obtained at the end device.

4. The computer-implemented method of claim 1, further comprising:
   establishing an analog communication session between the data network connection device and an Internet service provider; and
   using the analog communication session to send the inquiry to the billing server.

5. The computer-implemented method of claim 4, further comprising determining whether the problem is a network problem.

6. The computer-implemented method of claim 1, further comprising when the broadband connection is unavailable, initiating an analog communication session via the data network connection device.

7. The computer-implemented method of claim 1, wherein the end device is a computer.

8. The computer-implemented method of claim 1, wherein the end device is an Internet protocol telephone.

9. The computer-implemented method of claim 1, wherein the data network connection device is a router.

10. The computer-implemented method of claim 1, wherein the data network connection device is a modem.

11. The computer-implemented method of claim 1, wherein the data network connection device is a gateway.

12. The computer-implemented method of claim 1, wherein the data network connection device is operable to initiate a broadband communication session with an Internet service provider using a first set of authentication credentials.

13. The computer-implemented method of claim 12, wherein the data network connection device is operable to initiate an analog communication session with the Internet service provider using a second set of authentication credentials that is different from the first set of authentication credentials.

14. The computer-implemented method of claim 12, wherein the data network connection device is operable to initiate a broadband communication session with the Internet service provider using a second set of authentication credentials that is different from the first set of authentication credentials.

15. The computer-implemented method of claim 1, wherein the broadband connection is a digital subscriber line (DSL) connection.

16. An apparatus, comprising:
a data network connection device configured to:
establish a first data network connection to an Internet service provider;
establish a second data network connection between the data network connection device and the Internet service provider when a problem with the first data network connection is identified by a first diagnostic module of a computer coupled to the data network connection device; and
establish the second data network connection between the data network connection device and the Internet service provider when a problem with the first data network connection is identified by a second diagnostic module of a second device coupled to the data network connection device.

17. The apparatus of claim 16, wherein the first data network connection is a first broadband connection and the second data network connection is a second broadband connection.

18. The apparatus of claim 16, wherein the first data network connection is a broadband connection and the second data network connection is an analog connection.

19. The apparatus of claim 16, wherein the second device coupled to the data network connection device includes an Internet protocol telephone coupled to the data network connection device, the Internet protocol telephone including the second diagnostic module.

20. The apparatus of claim 19, further comprising:
an analog telephone coupled to the data network connection device,
wherein the data network connection device is operable to retrieve network information from the Internet service provider, and the data network connection device is operable to send the network information to the analog telephone.

\* \* \* \* \*